United States Patent
Joukan et al.

(10) Patent No.: US 7,870,325 B2
(45) Date of Patent: Jan. 11, 2011

(54) CACHE MEMORY SYSTEM

(75) Inventors: Seimizu Joukan, Osaka (JP); Tomohiro Hirata, Osaka (JP); Kiyoshi Owada, Osaka (JP)

(73) Assignee: Panasonic Corporation, Osaka (JP)

( * ) Notice: Subject to any disclaimer, the term of this patent is extended or adjusted under 35 U.S.C. 154(b) by 557 days.

(21) Appl. No.: 11/826,496

(22) Filed: Jul. 16, 2007

(65) Prior Publication Data

US 2008/0022040 A1    Jan. 24, 2008

(30) Foreign Application Priority Data

Jul. 19, 2006    (JP)    ............... 2006-196822

(51) Int. Cl.
*G06F 12/00* (2006.01)

(52) U.S. Cl. ..................................... 711/3

(58) Field of Classification Search ............ None
See application file for complete search history.

(56) References Cited

U.S. PATENT DOCUMENTS

| | | | |
|---|---|---|---|
| 5,119,290 A * | 6/1992 | Loo et al. | 711/210 |
| 5,361,340 A | 11/1994 | Kelly et al. | |
| 5,479,627 A | 12/1995 | Khalidi et al. | |
| 6,009,503 A | 12/1999 | Liedtke | |
| 6,058,447 A * | 5/2000 | Holst et al. | 710/105 |
| 6,253,285 B1 | 6/2001 | Razdan et al. | |
| 6,542,991 B1 | 4/2003 | Joy et al. | |
| 6,629,207 B1 * | 9/2003 | Yoshioka et al. | 711/125 |
| 6,725,337 B1 * | 4/2004 | Tan et al. | 711/133 |
| 2007/0033318 A1 * | 2/2007 | Gilday et al. | 711/3 |

FOREIGN PATENT DOCUMENTS

| | | |
|---|---|---|
| EP | 0 206 050 A3 | 12/1986 |
| JP | 6-139146 | 5/1994 |

OTHER PUBLICATIONS

United Kingdom Office Action issued in United Kingdom Patent Application No. GB0713897.7, mailed Nov. 2, 2007.

* cited by examiner

*Primary Examiner*—Hiep T Nguyen
(74) *Attorney, Agent, or Firm*—McDermott Will & Emery LLP

(57) ABSTRACT

The cache memory system 1 comprises: a virtual index obtaining unit 13 operable to obtain, based on a virtual address, virtual indexes of an access-target cache line and a cache line potentially having a cache-aliasing relationship with the access-target cache line; a physical tag obtaining unit 15 operable to obtain a physical tag of a physical page by performing address translation on the virtual address; and a comparing unit 16 operable to compare a physical tag TAG obtained by the physical tag obtaining unit 15 with each tag information piece TAG(i) belonging to cache lines corresponding to the virtual indexes and output from the tag array 11a based on the virtual indexes obtained by the virtual index obtaining unit 13, and determines a cache hit/miss.

8 Claims, 12 Drawing Sheets

CACHE MEMORY SYSTEM

BACKGROUND OF THE INVENTION (1) Field of the Invention

The present invention relates to a technology of performing memory access using the VIPT (Virtual Indexed Physical Tagged) architecture.

(2) Description of the Related Art

In order to make access to a direct map cache, the VIPT architecture has currently been employed. In the VIPT architecture, an access is made to a cache line of the cache memory based on a virtual index of a virtual address, and tag information (information indicating a physical page of the main memory, where data of the cache line was stored that is, information agreeing with a physical tag of the physical page) of the accessed cache line is read from the tag array. Address translation is performed on high-order bits of the virtual address to thereby obtain the physical tag of the physical address. Then, a cache hit or miss is determined by comparing the tag information read out from the tag array with the physical tag obtained by the address translation.

In the case where the size of the cache memory is larger than the physical page of the main memory, a so-called cache aliasing issue occurs. The following explains this cache aliasing issue.

FIG. 10 is used to explain cache lines, in a direct map cache memory, into which physical blocks are mapped. Assume that the size of the cache memory corresponds to two physical pages.

In this case, for example, it is cache lines line 1-1 and line 2-1 of the cache memory that into which physical blocks of physical pages page 1 to page m in line blk 1 of the main memory in FIG. 10 are possibly to be mapped. Similarly, it is cache lines line 1-$n$ and line 2-$n$ that into which physical blocks of physical pages page 1 to page m in line blk n are possibly to be mapped.

Among multiple cache lines into which a physical block is possibly to be mapped, cache lines that potentially have a cache aliasing relationship with one of the multiple cache lines are all the multiple cache lines except for this one cache line. For instance, a cache line that potentially has a cache aliasing relationship with the cache line line 1-1 is the cache line line 2-1, and a cache line that potentially has a cache aliasing relationship with the cache line line 2-1 is the cache line line 1-1.

FIG. 11 is used to explain the VIPT architecture. Assume that: the size of one physical page is 4 Kbytes; the size of the cache memory is 8 Kbytes; both the size of one cache line and the size of one physical block in the physical page are 16 bytes each; and one virtual address is 32 bits.

The size of the cache memory corresponds to two physical pages, and therefore, one physical address PA corresponds to two virtual addresses VA and VA', for example.

Since the size of one cache line is 16 bytes, the offset for identifying a word in the cache line is 4 bits in the $3^{rd}$ to $0^{th}$ bits. Since the size of the cache memory is 8 Kbytes and the size of one cache line is 16 bytes, virtual indexes VI and VI' for identifying cache lines in the cache memory are 9 bits in the $12^{th}$ to $4^{th}$ bits.

A virtual tag of 20 bits in the $31^{st}$ to $12^{th}$ bits of the virtual addresses VA and VA' is converted into 20 bits of the physical address PA, located in the $31^{st}$ to $12^{th}$ bits. Within the physical address PA, 19 bits in the $31^{st}$ to $13^{th}$ bits form a physical tag TAG for identifying a physical page of the main memory. Note that the $12^{th}$ bit of the physical address PA takes the same value for the virtual addresses VA and VA'.

For example, in the case where the virtual address VA is input, the physical tag TAG is compared with tag information stored in the tag array of a cache line corresponding to the virtual index VI of the virtual address VA. When they agree with each other, it is determined as a cache hit; when they do not agree, it is determined as a cache miss.

FIG. 12 is used to explain a cache aliasing issue.

Assume, for example, that a first process makes memory access using the virtual address VA while a second process makes memory access using the virtual address VA'. In this case, as shown in (a) of FIG. 12, in the tag array, tag information indicating a physical page P0 which includes the physical address PA corresponding to the virtual addresses VA and VA' is stored in entries of cache lines corresponding to the virtual indexes VI and VI' of the cache memory. In the data array, data D1 of a physical block in the physical page P0 is stored in entries of the corresponding cache lines. Thus, data of the same physical block of the same physical page is stored in two cache lines.

Under this condition, if one process writes data D2 to the main memory using the virtual address VA, then the tag information indicating the physical page P0 and the data D2, respectively, are stored in the entries, in the tag array and data array, of the cache line corresponding to the virtual index VI, as shown in (b) of FIG. 12. The data D2 is also written to the main memory. However, within the data array, in the cache line corresponding to the virtual index VI', the old data D1 is still stored.

Thus, although data of the same physical block of the same physical page is stored in the cache lines corresponding to the virtual indexes VI and VI', respectively, data in the cache lines corresponding to the virtual indexes VI and VI' is different from each other, which results in a cache aliasing issue.

The following technology is one example of how to solve this cache aliasing issue.

Address translation is performed on a virtual tag of a virtual address of a cache line to be accessed, and thereby a physical tag is obtained. This physical tag is compared not only with the tag information of the accessed cache line but also with the tag information of cache lines that potentially have a cache aliasing issue with the accessed cache line. Then, when the physical tag agrees with the tag information of the accessed cache line and also agrees with the tag information of the cache lines potentially having the cache-aliasing relationship, cache aliasing is detected and the entire cache memory is flushed (e.g. Japanese Laid-Open Patent Application Publication No. H6-139146).

According to this technology, however, the process of detecting cache aliasing cannot be commenced until the address translation from a virtual address to a physical address is completed, which leads to a decrease in the memory access rate. In addition, flushing the entire cache memory when cache aliasing is detected results in an increase in the number of times to access the main memory, whereby increasing the average amount of time required for the memory access.

SUMMARY OF THE INVENTION

The present invention has been made in the view of the above problems, and aims to provide a cache memory system and a cache aliasing prevention method that have no need to perform cache aliasing detection by preventing data of the same physical block of the same physical page from being stored in two or more cache lines of the cache memory. The present invention also aims to provide a cache memory system and a cache aliasing detection method capable of detecting cache aliasing using a virtual address only to thereby prevent the above problems.

In order to achieve the above objects, a cache memory system of the present invention is for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks. The cache memory system comprising: a virtual index obtaining unit operable to obtain, based on a virtual address, virtual indexes of an access-target cache line and one or more cache lines potentially having a cache-aliasing relationship with the access-target cache line; a physical tag obtaining unit operable to obtain a physical tag of a physical page by converting at least part of the virtual address; and a comparing unit operable to compare the physical tag with each of tag information pieces output from the tag array based on the virtual indexes, and determine a cache hit when one of the tag information pieces agrees with the physical tag.

The cache aliasing prevention method of the present invention is used in a cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks. The cache aliasing prevention method comprising the steps of: obtaining, based on a virtual address, virtual indexes of an access-target cache line and a cache line potentially having a cache-aliasing relationship with the access-target cache line; obtaining a physical tag of a physical page by converting at least part of the virtual address; and comparing whether the physical tag agrees with one of tag information pieces output from the tag array based on the virtual indexes, and determining a cache hit when a comparison result is affirmative and determining a cache miss when the comparison result is negative.

According to each of the above cache memory system and the cache aliasing preventing method, the cache hit/miss judgment is made on all the access-target cache line and the cache line potentially having a cache-aliasing relationship with the access-target cache line. Therefore, data of the same physical block of the same physical page is not stored in two or more cache lines, thus preventing cache aliasing.

The above cache memory system may further comprise: a cache fill unit operable to, (i) when none of the tag information pieces agrees with the physical tag and (ii) if at least one of the access-target cache line and the cache line potentially having a cache-aliasing relationship includes no data therein, perform a cache fill on one of the at least one cache line including no data therein.

Herewith, in the case where a cache miss occurs and then at least one of the access-target cache line and the cache line potentially having a cache-aliasing relationship includes no data therein, data of the main memory is filled in one of the cache lines having no data therein. This reduces the number of times data of physical blocks of other physical pages stored in the cache memory to be overwritten, and therefore the average amount of time required for the memory access can be shortened.

The cache memory system of the present invention is for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks. The cache memory system comprises: a virtual index obtaining unit operable to obtain, based on a virtual address, virtual indexes of an access-target cache line and one or more cache lines potentially having a cache-aliasing relationship with the access-target cache line; and a comparing unit operable to detect cache aliasing by comparing a tag information piece output from the tag array based on the virtual index of the access-target cache line with tag information pieces output from the tag array based on the virtual indexes of the cache lines potentially having a cache-aliasing relationship.

The cache aliasing detection method of the present invention is used in a cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks. The cache memory system comprises: a virtual index obtaining unit operable to obtain, based on a virtual address, virtual indexes of an access-target cache line and a cache line potentially having a cache-aliasing relationship with the access-target cache line; and a comparing unit operable to detect cache aliasing by comparing a tag information piece output from the tag array based on the virtual index of the access-target cache line with a tag information piece output from the tag array based on the virtual index of the cache line potentially having a cache-aliasing relationship.

Each of the cache memory system and the cache aliasing detection method obtains the virtual indexes of the access-target cache line and the cache line potentially having a cache-aliasing relationship with the access-target cache line, without performing address translation of the virtual address. Then, cache aliasing detection is performed by comparing the tag information piece output from the tag array based on the virtual index of the access-target cache line with the tag information piece output from the tag array based on the virtual index of the cache line potentially having a cache-aliasing relationship. Therefore, the cache aliasing detection can be commenced without waiting for the completion of the address translation from the virtual address to the physical address. This enables cache aliasing to be detected while suppressing a decrease in the memory access rate.

In the above cache memory system, the cache memory may be a write-through cache, and the cache memory system may further comprise: a revoking unit operable to, if the comparing unit detects the cache aliasing, revoke the access-target cache line and the cache lines having a cache-aliasing relationship; and a cache fill unit operable to perform a cache fill on one of the cache lines having revoked by the revoking unit to fill data of the main memory therein.

Herewith, in the case where cache aliasing is detected, the access-target cache line and the cache lines having a cache-aliasing relationship with the access-target cache line are revoked, and then data of the main memory is filled in one of the revoked cache lines. Accordingly, cache aliasing can be prevented from subsequently occurring.

In the above cache memory system, the cache memory may be a write-through cache, and the cache memory system may further comprise: a revoking unit operable to, if the comparing unit detects the cache aliasing and a write request is to be performed, revoke the cache lines having a cache-aliasing relationship; a physical tag obtaining unit operable to obtain a physical tag of a physical page by converting at least part of the virtual address; and a physical tag comparing unit operable to compare whether the tag information piece of the access-target cache line agrees with the physical tag, and determine a cache hit when a comparison result is affirmative and determine a cache miss when the comparison result is negative.

Herewith, in the case where cache aliasing is detected, the cache lines having a cache-aliasing relationship with the access-target cache line are revoked, and then the cache hit/miss judgment is performed on the access-target cache line. Accordingly, cache aliasing can be prevented from subsequently occurring.

In the above cache memory system, the cache memory may be a write-through cache, and the cache memory system may further comprise: a revoking unit operable to, if the comparing unit detects the cache aliasing and a read request is to be performed, revoke the access-target cache line and the cache lines having a cache-aliasing relationship, except for one cache line; a physical tag obtaining unit operable to obtain a physical tag of a physical page by converting at least part of the virtual address; and a physical tag comparing unit operable to compare whether a tag information piece of the one cache line not revoked by the revoking unit agrees with the physical tag, and determine a cache hit when a comparison result is affirmative and determine a cache miss when the comparison result is negative.

Herewith, in the case where cache aliasing is detected, revocation is carried out on the access-target cache line and the cache lines having a cache-aliasing relationship with the access-target cache line, except for one of these cache lines. Then, the cache hit/miss judgment is performed on the unrevoked cache line. Accordingly, cache aliasing can be prevented from subsequently occurring.

BRIEF DESCRIPTION OF THE DRAWINGS

These and other objects, advantages and features of the invention will become apparent from the following description thereof taken in conjunction with the accompanying drawings which illustrate a specific embodiment of the invention.

DESCRIPTION OF THE PREFERRED EMBODIMENT

Embodiment 1

Embodiment 1 of the present invention is explained next with reference to drawings. Note that the present and following embodiments are illustrated with a case where an access is made to a direct map cache memory using the VIPT architecture and the size of the cache memory is larger than the size of a physical page of the main memory.

<Structure>

Figure 1:
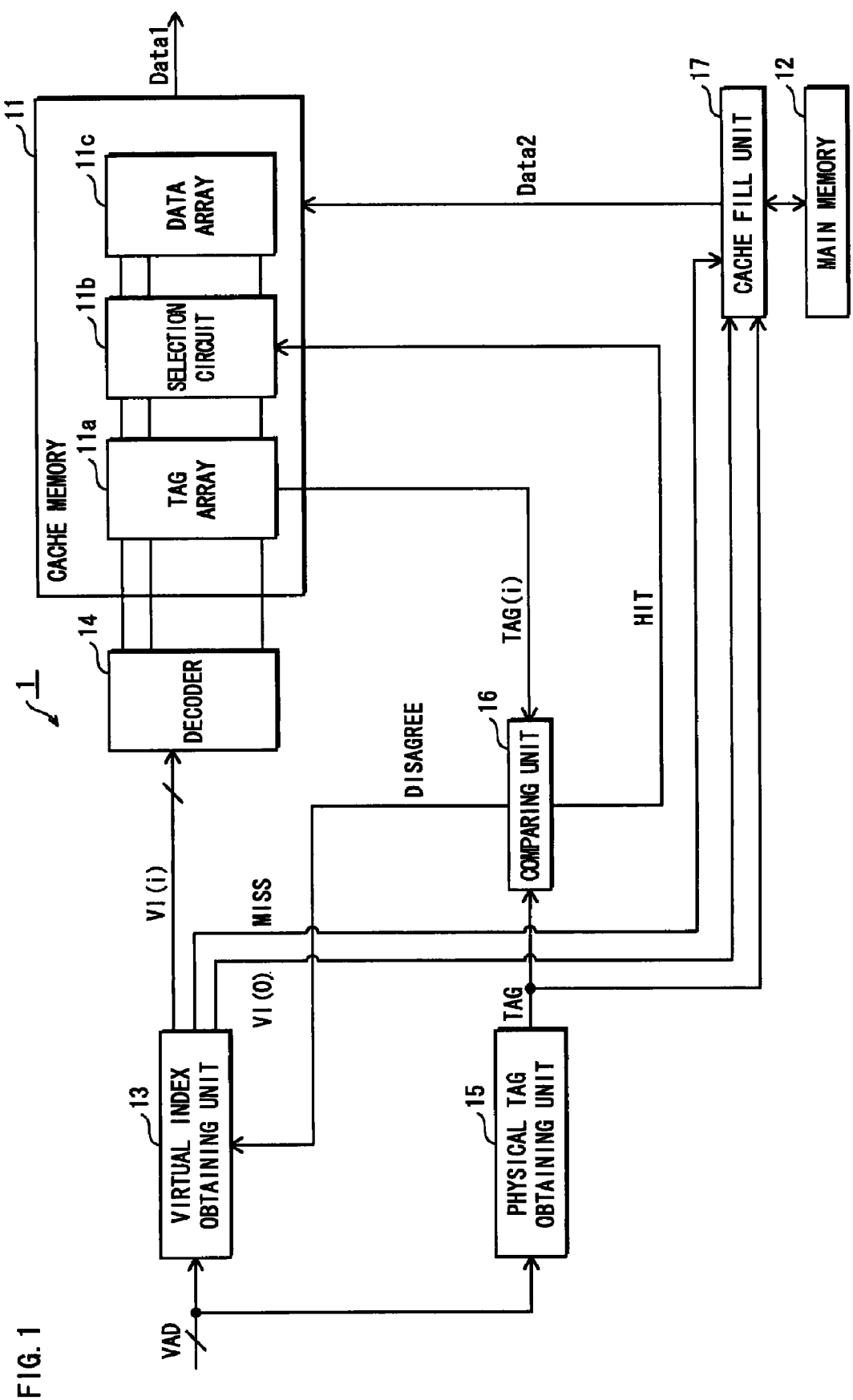
FIG. 1 shows a structure of a cache memory system of Embodiment 1.

The structure of a cache memory system of the present embodiment is described with reference to FIG. 1. FIG. 1 shows the structure of the cache memory system.

A cache memory system 1 includes: a cache memory 11; a main memory 12; a virtual index obtaining unit 13; a decoder 14; a physical tag obtaining unit 15; a comparing unit 16; and a cache fill unit 17.

The cache memory 11 includes a tag array 11a, a selection circuit 11b and a data array 11c. In the cache memory 11, an access is made to a cache line corresponding to a decoded virtual address, and then data is extracted from the tag array 11a and data array 11c.

Figure 10:
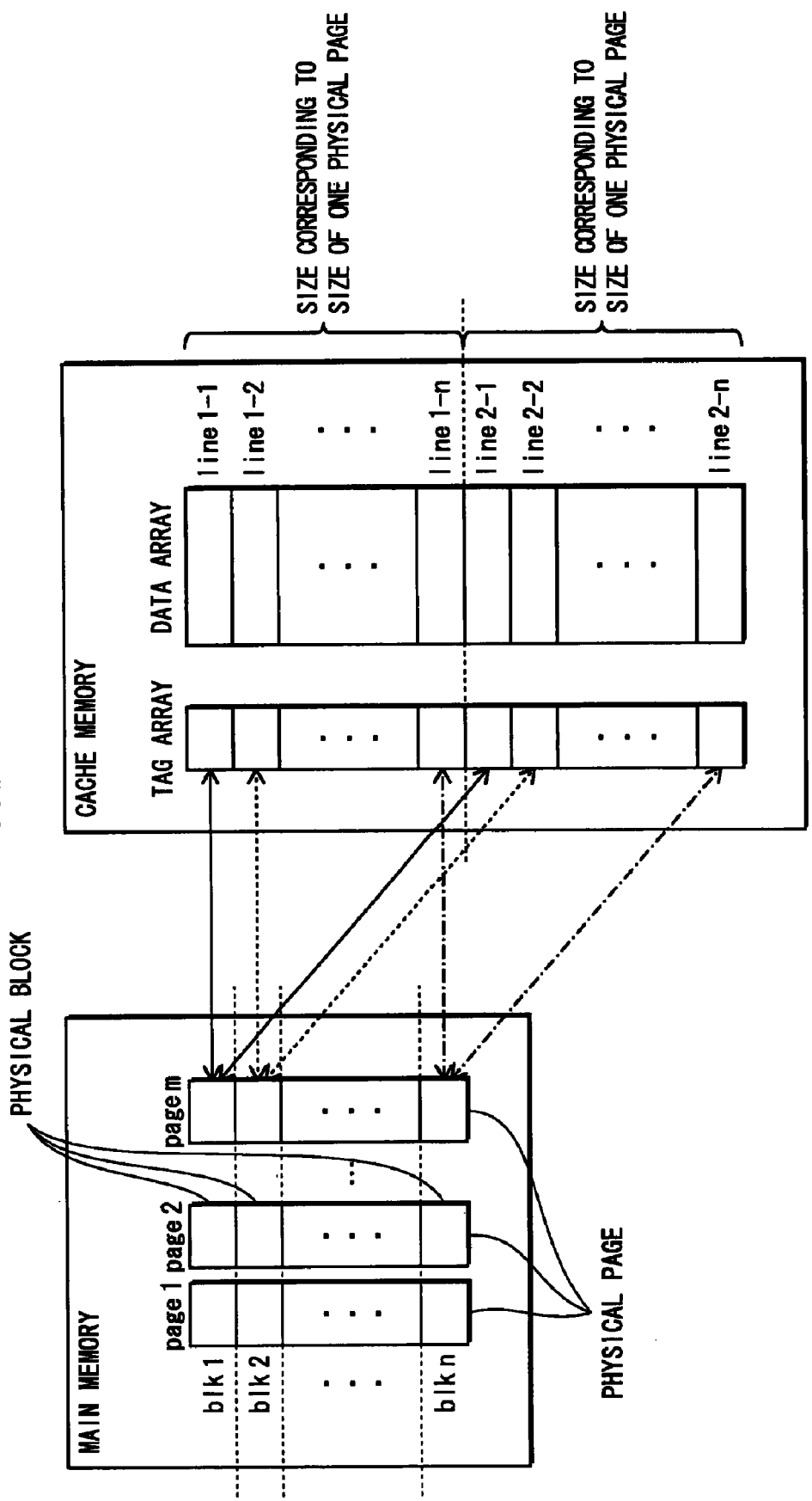
FIG. 10 is for explaining cache lines, in a direct map cache memory, into which physical blocks are mapped.

Data stored in the entry of each cache line in the data array 11c is data of one of the physical blocks having the above relationship—mentioned with reference to FIG. 10—with a corresponding cache line.

Tag information is stored in the entry of each cache line in the tag array 11a. The tag information is for identifying a physical page that includes a physical block where the data in the corresponding entry of the data array 11c was stored. (The tag information agrees with a physical tag of the physical page.)

The selection circuit 11b outputs, to a microprocessor (not shown) data Data 1 extracted from a cache line, in the data array 11c, corresponding to a virtual index that is decoded in accordance with a hit signal from the comparing unit 16.

The main memory 12 is composed of multiple physical pages, each of which is composed of multiple physical blocks. For each physical block of any physical page, multiple cache lines, within the cache memory 11, into which the physical block is potentially mapped are predetermined.

The virtual index obtaining unit 13 obtains, based on a virtual address VAD input from the microprocessor, a virtual index VI(0) of an access-target cache line and virtual indexes VI(1), VI(2), . . . of cache lines that potentially have a cache-aliasing relationship with the access-target cache line. Then, the virtual index obtaining unit 13 outputs the obtained virtual indexes VI(i) (i=0, 1, 2, . . . ) to the decoder 14, and also outputs the virtual index VI(0) to the cache fill unit 17. To be more specific, the virtual index obtaining unit 13 first outputs the virtual index VI(0) to the decoder 14 when the virtual address VAD is input from the microprocessor, and subsequently on each occasion when a disagreement signal is input from the comparing unit 16, the virtual index obtaining unit 13 outputs, from among the virtual indexes VI(1), VI(2), . . . , one having yet to be output to the decoder 14.

Then, if the virtual index obtaining unit 13 has already output, to the decoder 14, the virtual index VI(0) of the access-target cache line as well as the virtual indexes VI(1), VI(2), . . . of all cache lines potentially having a cache-aliasing relationship with the access-target cache line when a disagreement signal is input from the comparing unit 16, the virtual index obtaining unit 13 outputs a miss signal indicating a cache miss to the cache fill unit 17.

The decoder 14 decodes the virtual index VI(i) (i=0, 1, 2, . . . ) input from the virtual index obtaining unit 13. With the decoded virtual index, an access is made to a cache line in the cache memory 11. Herewith, tag information TAG(i) corresponding to the virtual index VI(i) is extracted from the tag array 11a, and then the tag information TAG(i) is output to the comparing unit 16.

The physical tag obtaining unit 15 obtains a physical tag TAG by performing address translation on the virtual tag of the virtual address VAD, and outputs the physical tag TAG to the comparing unit 16.

The comparing unit 16 compares the physical tag TAG input from the physical tag obtaining unit 15 with the tag information TAG(i) input from the tag array 11a of the cache memory 11. The comparing unit 16 outputs a disagreement signal to the virtual index obtaining unit 13 when the physical tag TAG and the tag information TAG(i) do not agree with each other, and outputs a hit signal indicating a cache hit to the selection circuit 11b when they agree with each other.

The cache fill unit 17 extracts, when a miss signal is input from the virtual index obtaining unit 13, the data Data 2 by accessing the main memory 12 based on the physical tag TAG input from the physical-tag obtaining unit 15 and the virtual index VI(0) input from the virtual index obtaining unit 13. Then, the cache fill unit 17 stores the physical tag TAG and the data Data 2 in the entries, within the tag array 11a and the data array 11c, respectively, of a cache line corresponding to the virtual index VI(0) (fill).

[Structure of Virtual Index Obtaining Unit]

Figure 2:
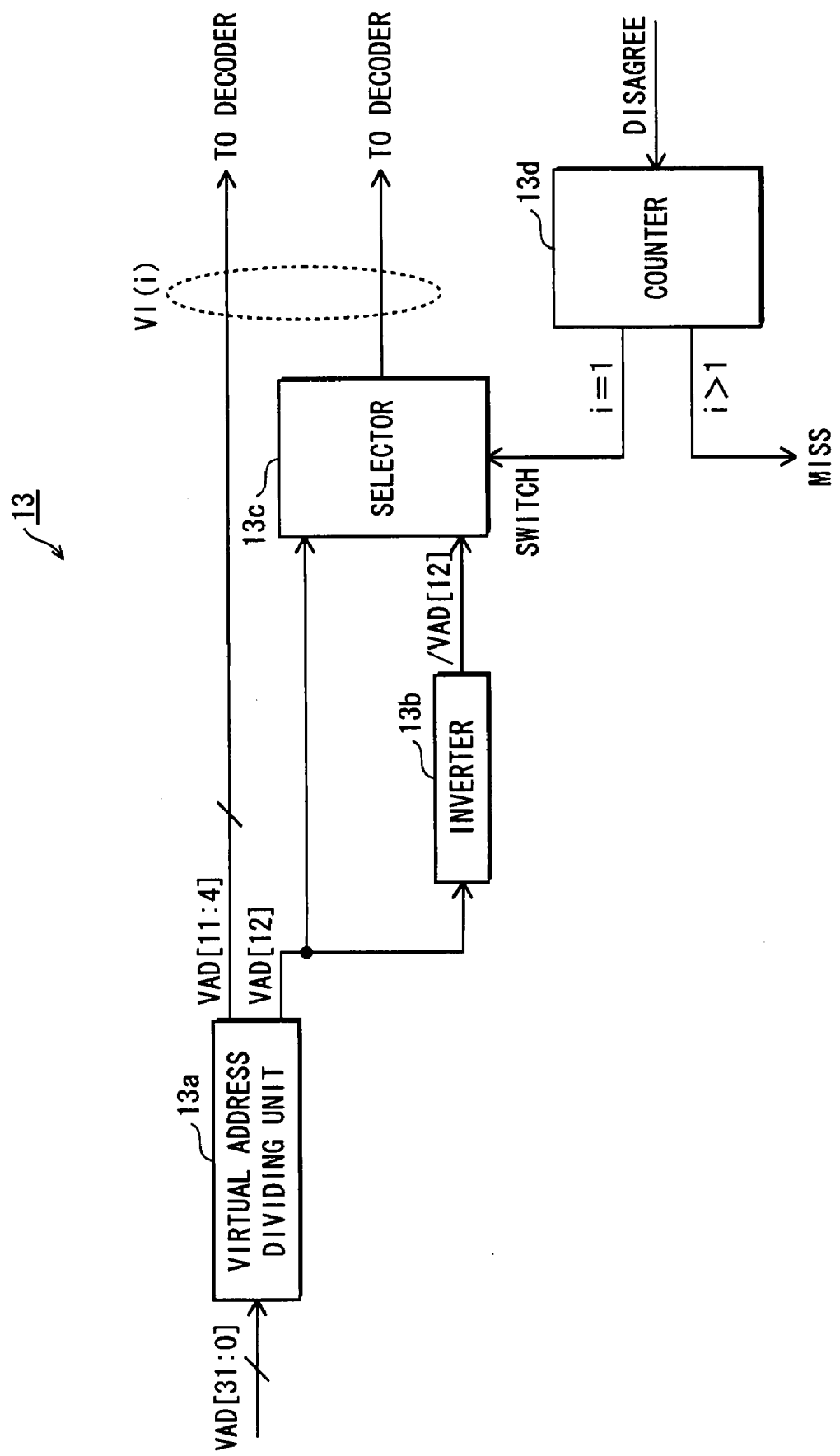
FIG. 2 shows a structure of a virtual index obtaining unit of FIG. 1.

The structure of the virtual index obtaining unit of FIG. 1 is explained with reference to FIG. 2. FIG. 2 shows one structural example of the virtual index obtaining unit of FIG. 1.

Assume that: the size of one physical page is 4 Kbytes; the size of the cache memory is 8 Kbytes; both the size of one cache line and the size of one physical block in a physical page are 16 bytes each; and one virtual address is 32 bits.

The size of the cache memory corresponds to two physical pages, and therefore the number of cache lines potentially having a cache-aliasing relationship with an access-target cache line is one.

Figure 11:
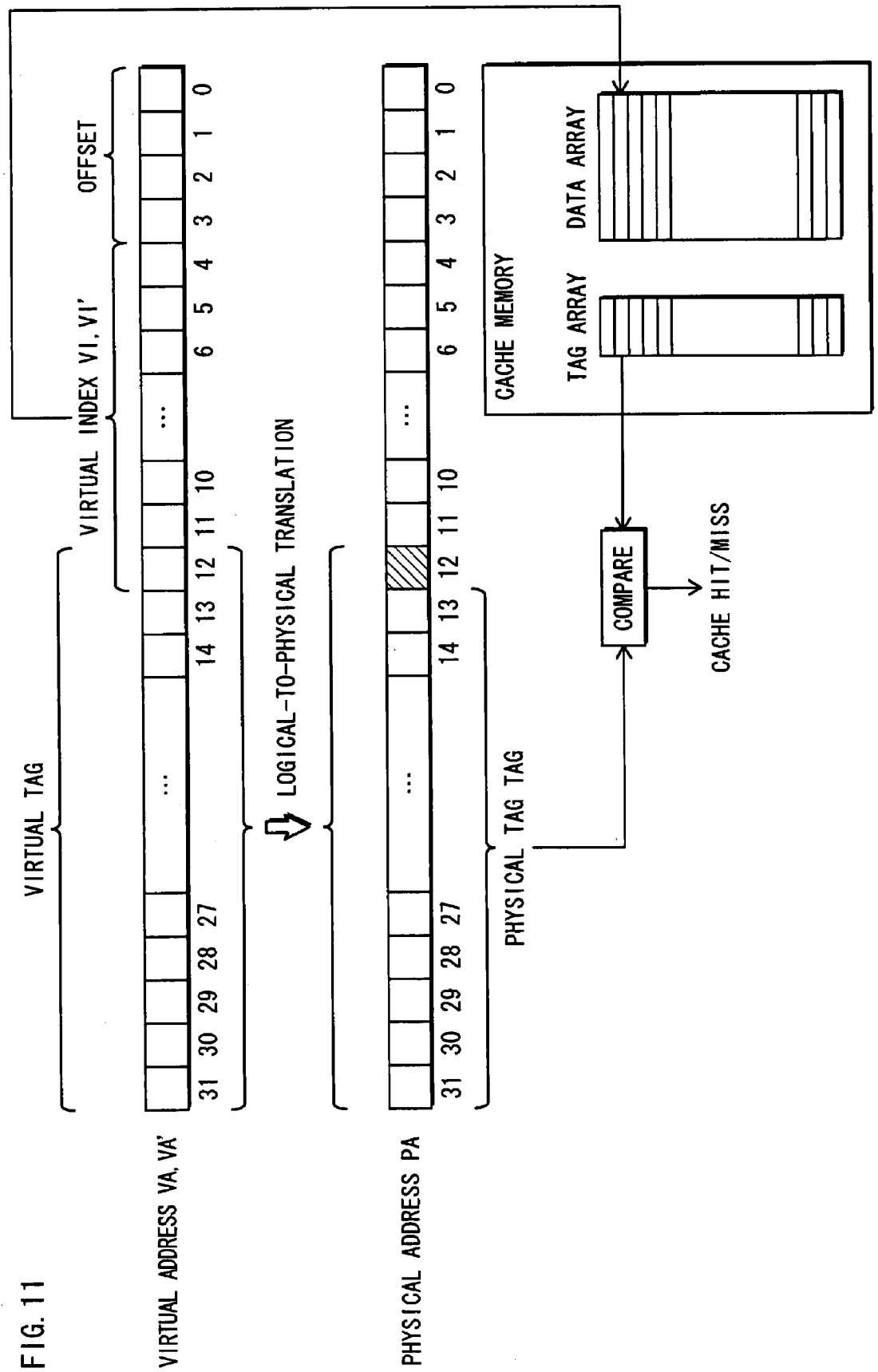
FIG. 11 is for explaining VIPT architecture.
Figure 12:
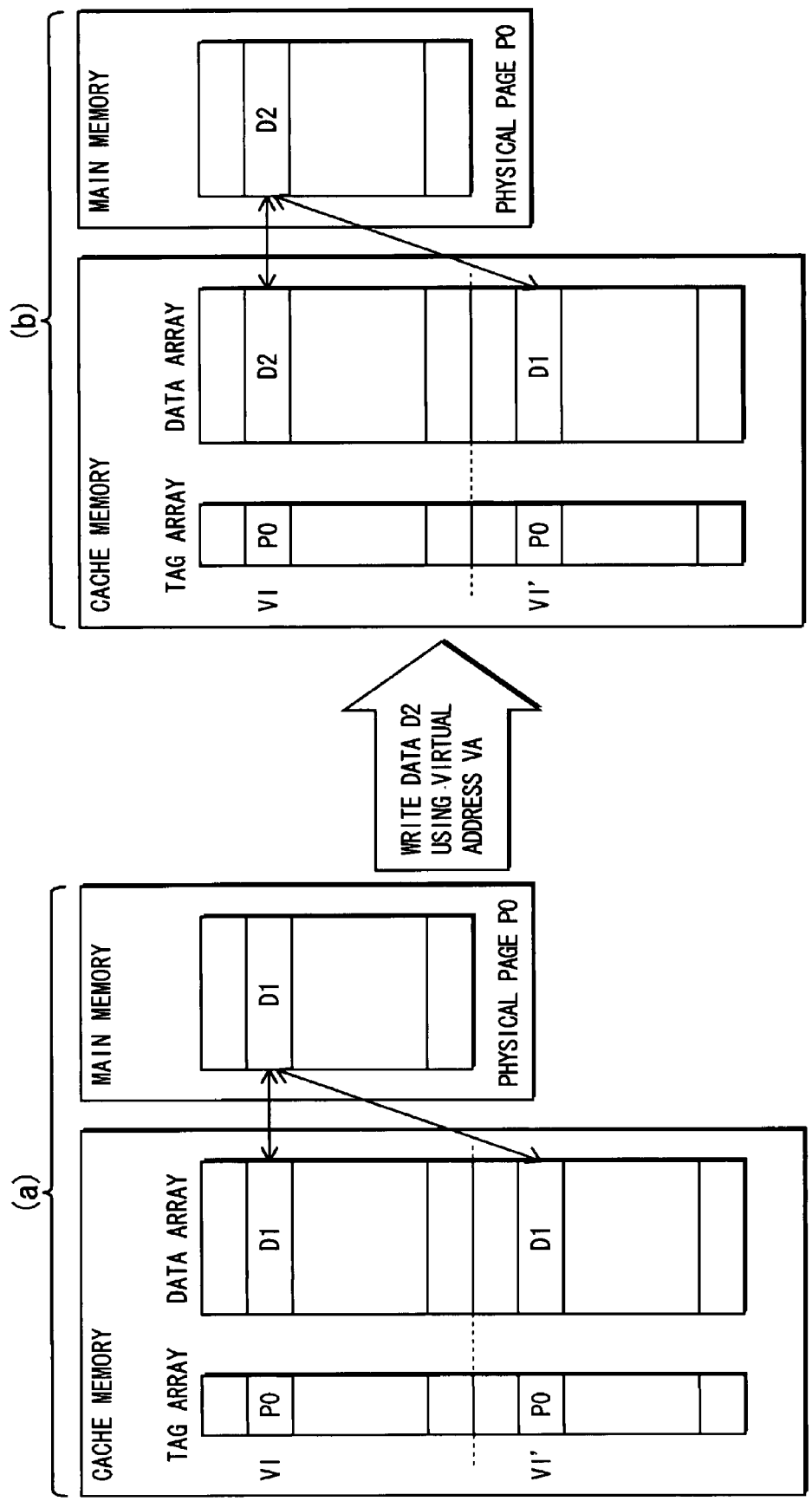
FIG. 12 is for explaining a cache aliasing issue.

9 bits in the $12^{th}$ to $4^{th}$ bit positions of the virtual address VAD form a virtual index, as in the case of FIG. 11. The virtual index VI(1) of a cache line, which potentially has a cache-aliasing relationship with the cache line corresponding to the virtual index VI(0) of the virtual address VAD, is a bit string obtained by inverting the highest-order bits of the virtual index VI(0).

The virtual index obtaining unit 13 includes a virtual address dividing unit 13a, an inverter 13b, a selector 13c and a counter 13d.

The virtual address dividing unit 13a outputs a virtual address VAD[11:4] in the $11^{th}$ to $4^{th}$ bit positions of the virtual address VAD[31:0] to the decoder 14, and outputs a virtual address VAD[12] in the $12^{th}$ bit position to the inverter 13b and the selector 13c.

The inverter 13b inverts the value of the virtual address VAD[12] input from the virtual address dividing unit 13a, and outputs the inverted virtual address/VAD[12] to the selector 13c. For example, when the value of the virtual address VAD [12] is 1, the value of the inverted virtual address/VAD[12] is 0.

The selector 13c selects, when the virtual address VAD[31: 0] is input to the virtual index obtaining unit 13, the virtual address VAD[12] input from the virtual address dividing unit 13a and then outputs this to the decoder 14. Herewith, the virtual index VI(0) (VAD[12:4]) of the virtual address VAD [31:0] is input to the decoder 14.

The selector 13c selects, when a switch signal from the counter 13d is input thereto, the inverted virtual address/VAD [12] input from the inverter 13b and then outputs this to the decoder 14. Herewith, the virtual index VI(1) corresponding to a cache line potentially having a cache-aliasing relationship with the cache line corresponding to the virtual index VI(0) is input to the decoder 14.

The counter 13d is reset when the virtual address VAD[31: 0] is input to the virtual index obtaining unit 13, and counts the number of disagreement signals. Since the number of cache lines potentially having the cache-aliasing relationship is one, the counter 13d outputs a switch signal to the selector 13c when the counter value is 1. If the counter value exceeds 1, the counter 13d outputs a miss signal indicating a cache miss to the cache fill unit 17.

In the case where the size of the cache memory corresponds to four physical pages, virtual indexes of cache lines potentially having a cache-aliasing relationship with an access-target cache line are, among virtual indexes obtained by combining bit values of the upper two bits in the virtual indexes, those except for the virtual index of the access-target cache line. In this case, two inverters are provided, and the counter 13d performs switch control on outputs of the two inverters if the counter value is 3 or less. Note that the number of cache lines potentially having a cache-aliasing relationship with the access-target cache line is three.

Thus, the virtual indexes of the cache lines potentially having the cache-aliasing relationship can be obtained by changing the bit values of some upper bit positions (the number of bit positions are determined by the size of the cache memory and the size of each physical page) of the virtual index of the access-target cache line.

<Operations>

Figure 3:
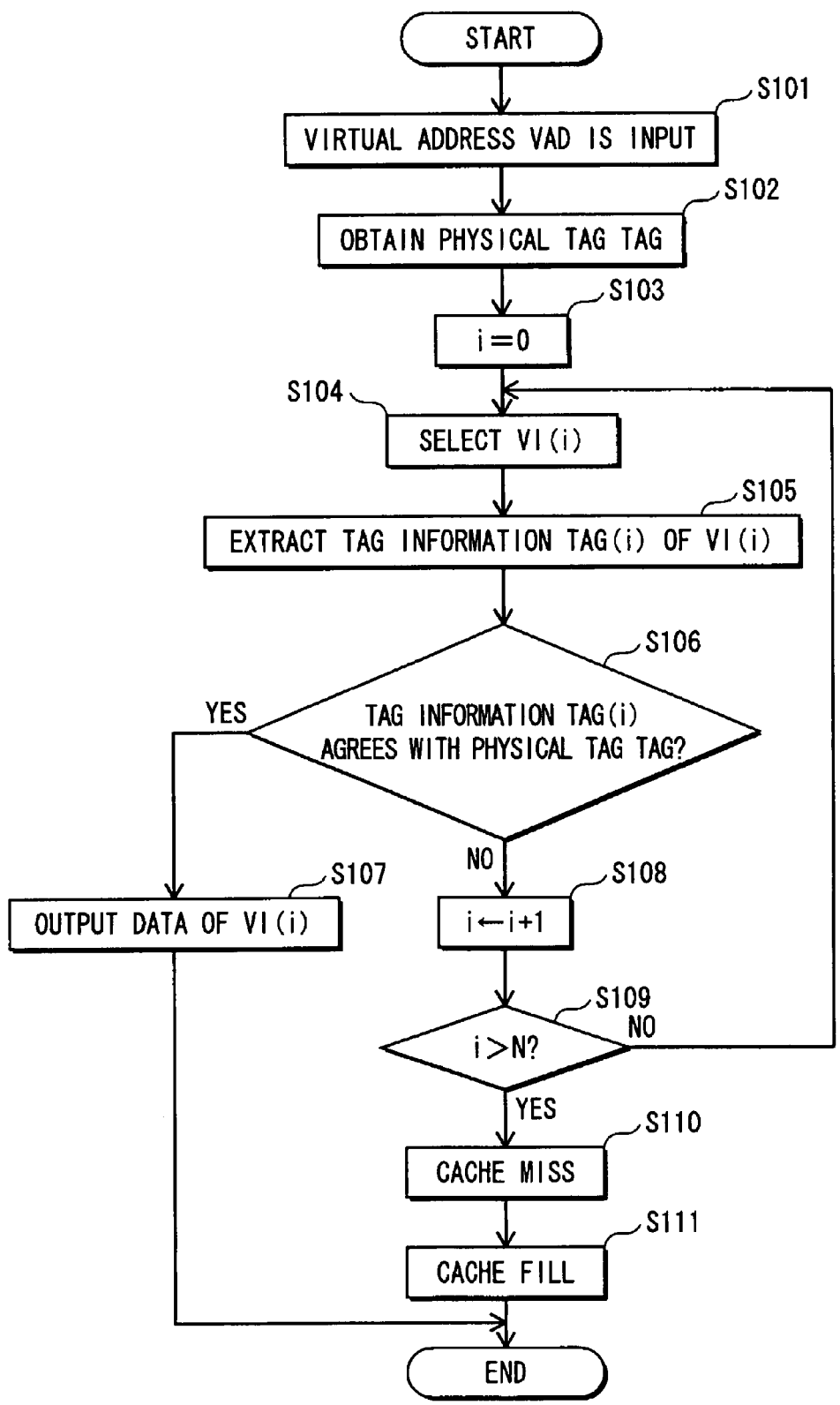
FIG. 3 is a flowchart showing operations of the cache memory system of FIG. 1.

The operations of the cache memory system of FIG. 1 are described with reference to FIG. 3. FIG. 3 is a flowchart of the operations of the cache memory system of FIG. 1.

The virtual address VAD is input from the microprocessor to the virtual index obtaining unit 13 and the physical tag obtaining unit 15 (Step S101). The physical tag obtaining unit 15 obtains the physical tag TAG based on the virtual address VAD (Step S102). The virtual index obtaining unit 13 sets 0 to the counter value i (Step S103).

The virtual index obtaining unit 13 selects the virtual index VI(i) as a virtual index to be output to the decoder 14, and outputs the selected virtual index VI(i) to the decoder 14 (Step S104).

The virtual index VI(i) is decoded by the decoder 14, and an access is made to a cache line corresponding to the virtual index VI(i). Herewith, the tag information TAG(i) corresponding to the virtual index VI(i) is extracted from the tag array 11a, and the extracted tag information TAG(i) is output to the comparing unit 16 (Step S105).

The comparing unit 16 compares the tag information TAG (i) and the physical tag TAG (Step S106).

In the comparison, if the tag information TAG(i) agrees with the physical tag TAG (S106: YES), the comparing unit 16 outputs a hit signal indicating a cache hit to the selection circuit 11b. Herewith, the selection circuit 11b outputs data of a cache line corresponding to the virtual index VI(i) to the microprocessor (Step S107).

In the comparison, if the tag information TAG(i) does not agree with the physical tag TAG (S106: NO), the comparing unit 16 outputs a disagreement signal to the virtual index obtaining unit 13, and the virtual index obtaining unit 13 then increases the counter value i by 1 (Step S108).

The virtual index obtaining unit 13 judges whether the counter value i, after the increment, is larger than a constant N (Step S109). Note that the constant N is determined by the size of the physical page and the size of the cache memory. For instance, if the size of the cache memory corresponds to two physical pages, the constant N is 1; if the size of the cache memory corresponds to four physical pages, the constant N is 3.

If the counter value i is not larger than the constant N (S109: NO), the process of Step S104 onwards is executed in order to perform a judgment process on a cache line potentially having the cache-aliasing relationship and having yet to be a target of the cache hit/miss judgment.

The counter value i being larger than the constant N (S109: YES) means that none of the tag information TAG(i) (i=0, 1, ..., N) of the access-target cache line and all the cache lines potentially having a cache-aliasing relationship with the access-target cache line agrees with the physical tag TAG. Accordingly, the virtual index obtaining unit 13 outputs a miss signal indicating a cache miss to the cache fill unit 17 (Step S110).

The cache fill unit 17 fills data of the main memory 12 in a cache line of the cache memory 11, corresponding to the virtual index VI(0) (Step S111).

Embodiment 2

Embodiment 2 of the present invention is explained next with reference to drawings. Embodiment 1 avoids cache aliasing by preventing data of the same physical block of the same physical page from being stored in two or more cache lines of the cache memory at the same time. On the other hand, Embodiment 2 detects cache aliasing which is caused by storing data of the same physical block of the same physical page in two or more cache lines of the cache memory.

<Structure>

Figure 4:
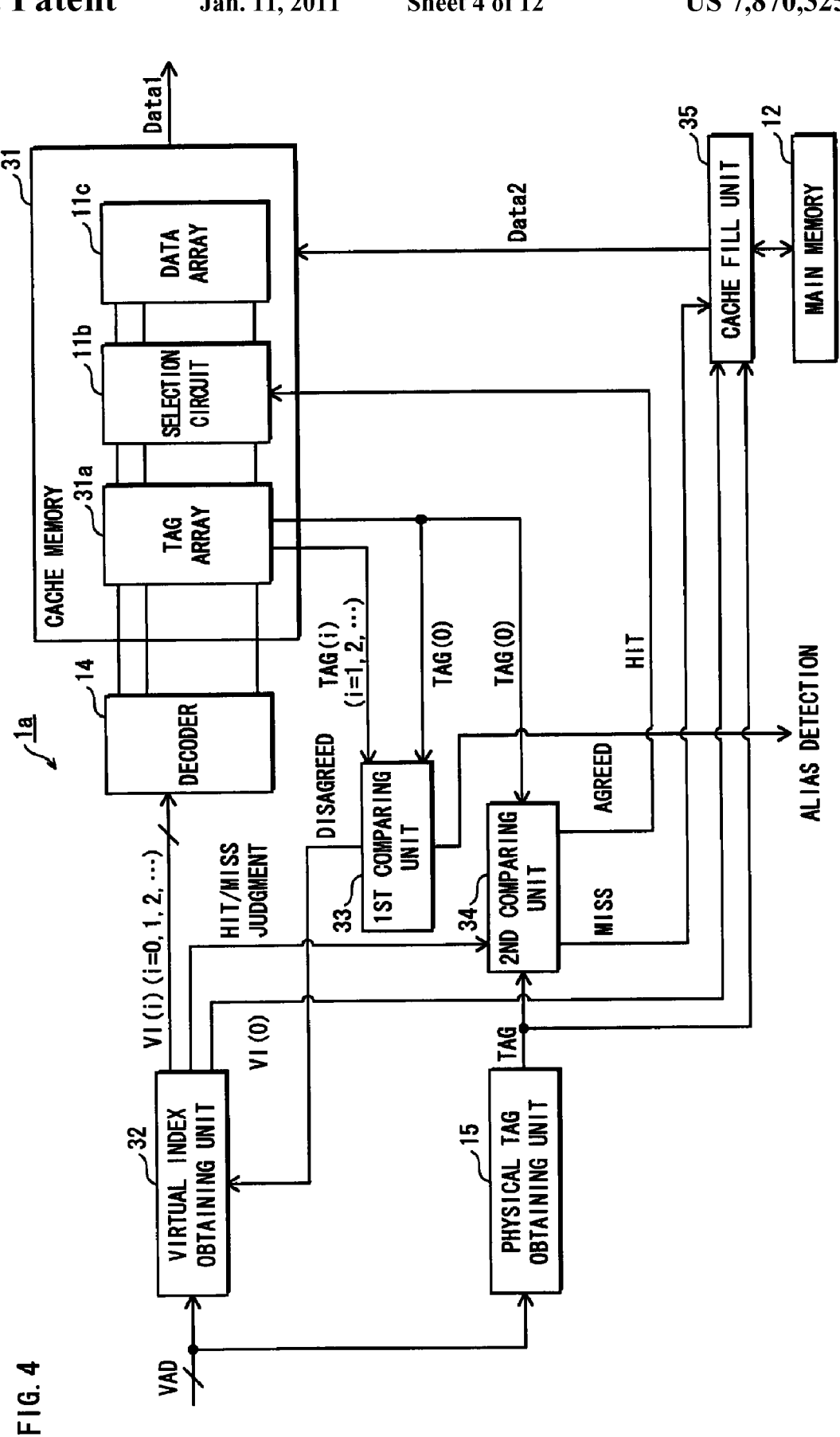
FIG. 4 shows a structure of a cache memory system of Embodiment 2.

The structure of a cache memory system of the present embodiment is described with reference to FIG. 4. FIG. 4 shows the structure of the cache memory system. Note that, in Embodiment 2, the components having the same functions as those in Embodiment 1 are given the same reference numerals or symbols, and their descriptions are omitted since the corresponding descriptions in Embodiment 1 can be applied here.

A cache memory system 1a includes: a cache memory 31; the main memory 12; a virtual index obtaining unit 32; the decoder 14; the physical tag obtaining unit 15; a $1^{st}$ comparing unit 33; a $2^{nd}$ comparing unit 34; and a cache fill unit 35.

The cache memory 31 includes a tag array 31a, the selection circuit 11b and the data array 11c. In the cache memory 31, an access is made to a cache line corresponding to a decoded virtual address, and then data is extracted from the tag array 31a and data array 11c.

Tag information TAG(0) of an access-target cache line is output from the tag array 31a to the $1^{st}$ and $2^{nd}$ comparing units 33 and 34. In addition, tag information TAG(i) (i=1, 2, ...) of the cache lines potentially having a cache-aliasing relationship with the access-target cache line is output from the tag array 31a to the $1^{st}$ comparing unit 33.

The virtual index obtaining unit 32 obtains, based on the virtual address VAD input from a microprocessor (not shown), a virtual index VI(0) of the access-target cache line and virtual indexes VI(1), VI(2), ... of cache lines potentially having a cache-aliasing relationship with the access-target cache line. Then, the virtual index obtaining unit 32 outputs the obtained virtual indexes VI(i) (i=0, 1, 2, ...) to the decoder 14, and also outputs the virtual index VI(0) to the cache fill unit 35. To be more specific, the virtual index obtaining unit 32 first outputs the virtual index VI(0) and the virtual index VI(1) sequentially to the decoder 14 when the virtual address VAD is input from the microprocessor, and subsequently on each occasion when a disagreement signal is input from the $1^{st}$ comparing unit 33, the virtual index obtaining unit 32 outputs, from among the virtual indexes VI(2), VI(3), ..., one having yet to be output to the decoder 14.

Then, if the virtual index obtaining unit 32 has already output, to the decoder 14, the virtual indexes VI(1), VI(2), ... of all the cache lines potentially having a cache-aliasing relationship with the access-target cache line when a disagreement signal is input from the $1^{st}$ comparing unit 33, the virtual index obtaining unit 32 outputs a hit/miss judgment signal to the 21 comparing unit 34.

The $1^{st}$ comparing unit 33 compares the tag information TAG(0) of the access-target cache line to the tag information TAG(i) (i=1, 2, ...) of the cache lines potentially having a cache-aliasing relationship with the access-target cache line. Then, if the tag information TAG(0) and tag information TAG(i) agree with each other, the $1^{st}$ comparing unit 33 outputs, to the microprocessor, an aliasing detection signal indicating a detection of cache aliasing; if they do not agree, the $1^{st}$ comparing unit 33 outputs a disagreement signal to the virtual index obtaining unit 32.

The $2^{n}$ comparing unit 34 compares, when a hit/miss judgment signal is input from the virtual index obtaining unit 32, the physical tag TAG input from the physical tag obtaining unit 15 to the tag information TAG(0) input from the tag array 31a. Then, the $2^{nd}$ comparing unit 34 outputs a miss signal indicating a cache miss to the cache fill unit 35 when the physical tag TAG and tag information TAG(0) do not agree with each other, and outputs a hit signal indicating a cache hit to the selection circuit 11b when they agree with each other.

The cache fill unit 35 performs, when a miss signal is input from the $2^{nd}$ comparing unit 34, the same process as performed by the cache fill unit 17 to thereby store data in a cache line corresponding to the virtual index VI(0) (fill).

<Operations>

Figure 5:
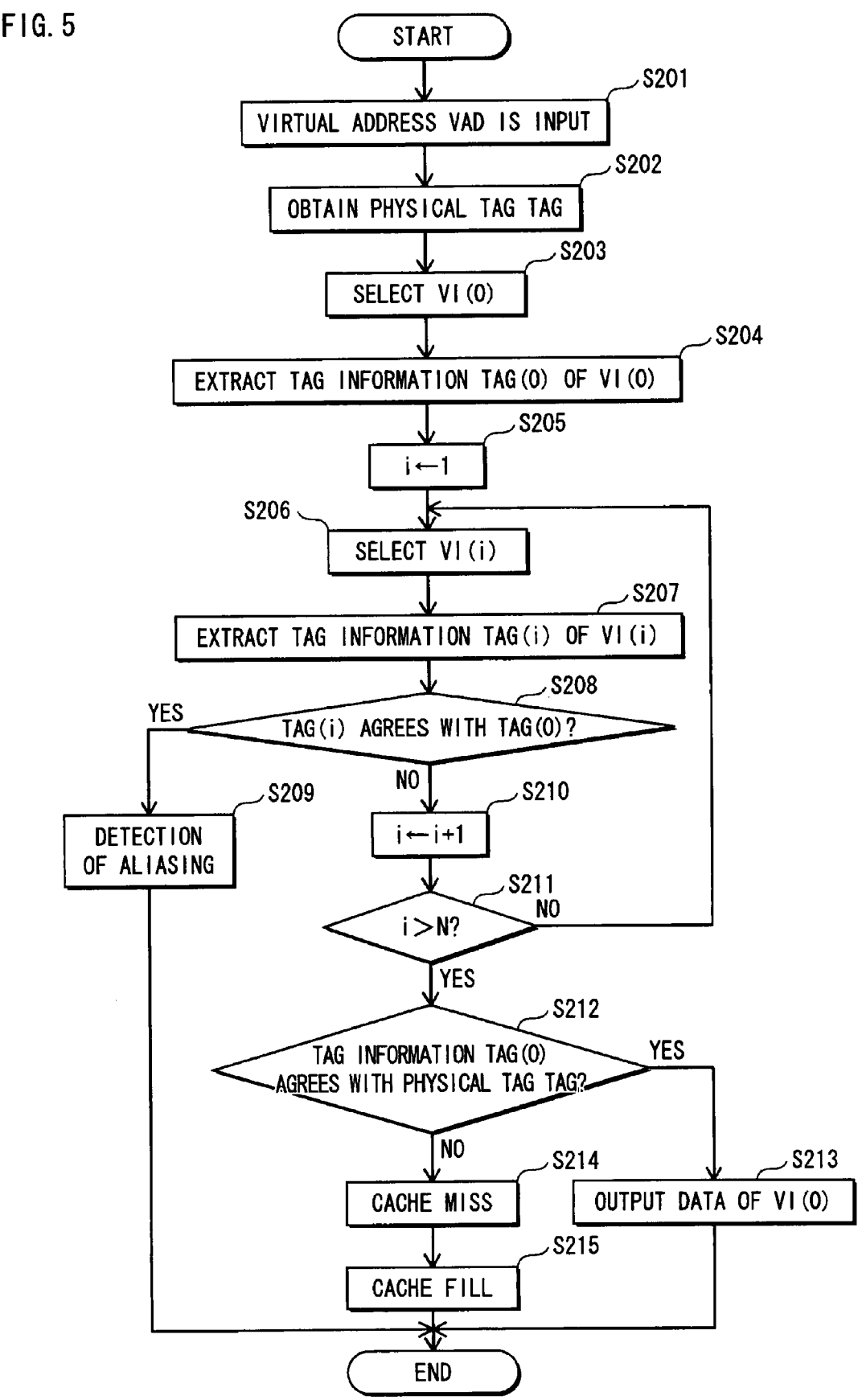
FIG. 5 is a flowchart showing operations of the cache memory system of FIG. 4.

The operations of the cache memory system of FIG. 4 are described with reference to FIG. 5. FIG. 5 is a flowchart of the operations of the cache memory system of FIG. 4.

The virtual address VAD is input from the microprocessor to the virtual index obtaining unit 32 and the physical tag obtaining unit 15 (Step S201). The physical tag obtaining unit 15 obtains the physical tag TAG based on the virtual address VAD (Step S202). The virtual index obtaining unit 32 selects the virtual index VI(0) of the access-target cache line as the virtual index to be output to the decoder 14, and outputs the selected virtual index VI(0) to the decoder 14 (Step S203).

The virtual index VI(0) is decoded by the decoder 14, and an access is made to a cache line corresponding to the virtual index VI(0). Herewith, the tag information TAG(0) corresponding to the virtual index VI(0) is extracted from the tag array 31a, and the tag information TAG(0) is output to the $1^{st}$ and $2^{nd}$ comparing units 33 and 34 (Step S204).

The virtual index obtaining unit 32 sets 1 to the counter value i (Step S205).

The virtual index obtaining unit 32 selects, as a virtual index to be output to the decoder 14, the virtual index VI(i) of a cache line potentially having a cache-aliasing relationship with the access-target cache line, and outputs the selected virtual index VI(i) to the decoder 14 (Step S206).

The virtual index VI(i) is decoded by the decoder 14, and an access is made to a cache line corresponding to the virtual index VI(i). Herewith, the tag information TAG(i) corresponding to the virtual index VI(i) is extracted from the tag array 31$a$, and the tag information TAG(i) is output to the 1$^{st}$ comparing unit 33 (Step S207).

The 1$^{st}$ comparing unit 33 compares the tag information TAG(0) and the tag information TAG(i) (Step S208).

In the comparison, if the tag information TAG(i) agrees with the tag information TAG(0) (S208: YES), the 1$^{st}$ comparing unit 33 outputs an aliasing detection signal indicating a detection of cache aliasing to the microprocessor (Step S209).

In the comparison, if the tag information TAG(i) does not agree with the tag information TAG(0) (S208: NO), the 1$^{st}$ comparing unit 33 outputs a disagreement signal to the virtual index obtaining unit 32, and the virtual index obtaining unit 32 then increases the counter value i by 1 (Step S210).

The virtual index obtaining unit 32 judges whether the counter value i, after the increment, is larger than a constant N (Step S211). Note that the constant N is determined in the same manner as in Embodiment 1.

If the counter value i is not larger than the constant N (S211: NO), the process of Step S206 onwards is executed in order to perform a judgment process on a cache line potentially having the cache-aliasing relationship and having yet to be a target of the cache-alias judgment.

The counter value i being larger than the constant N (S211: YES) means that no cache aliasing was detected in any of the cache lines potentially having a cache-aliasing relationship with the access-target cache line. Accordingly, the virtual index obtaining unit 32 outputs a hit/miss judgment signal to the 2$^{nd}$ comparing unit 34. The 2$^{nd}$ comparing unit 34 compares, when a hit/miss judgment signal is input, the physical tag TAG to the tag information TAG(0) (Step S212).

In the comparison, if the tag information TAG(0) agrees with the physical tag TAG (S212: YES), the 2$^{nd}$ comparing unit 34 outputs a hit signal indicating a cache hit to the selection circuit 11$b$. Herewith, the selection circuit 11$b$ outputs data of a cache line corresponding to the virtual index VI(0) to the microprocessor (Step S213). Note that, in order to output data corresponding to the virtual index VI(0) to the microprocessor, the virtual index VI(0) is again decoded and then an access is made to the cache memory 31 based on the decoded virtual index.

In the comparison, if the tag information TAG(0) does not agree with the physical tag TAG (S212: NO), the 2$^{nd}$ comparison unit 34 outputs a miss signal indicating a cache miss to the cache fill unit 35 (Step S214). Then, the cache fill unit 35 fills data of the main memory 12 in a cache line of the cache memory 31, corresponding to the virtual index VI(0) (Step S215).

Embodiment 3

Embodiment 3 of the present invention is explained next with reference to drawings. Embodiment 3 is structured by adding, to the cache memory system of Embodiment 2, a function of revoking a cache line having a cache-aliasing relationship when cache aliasing is detected. Note that the cache memory of the present embodiment is a write-through cache memory.

<Structure>

Figure 6:
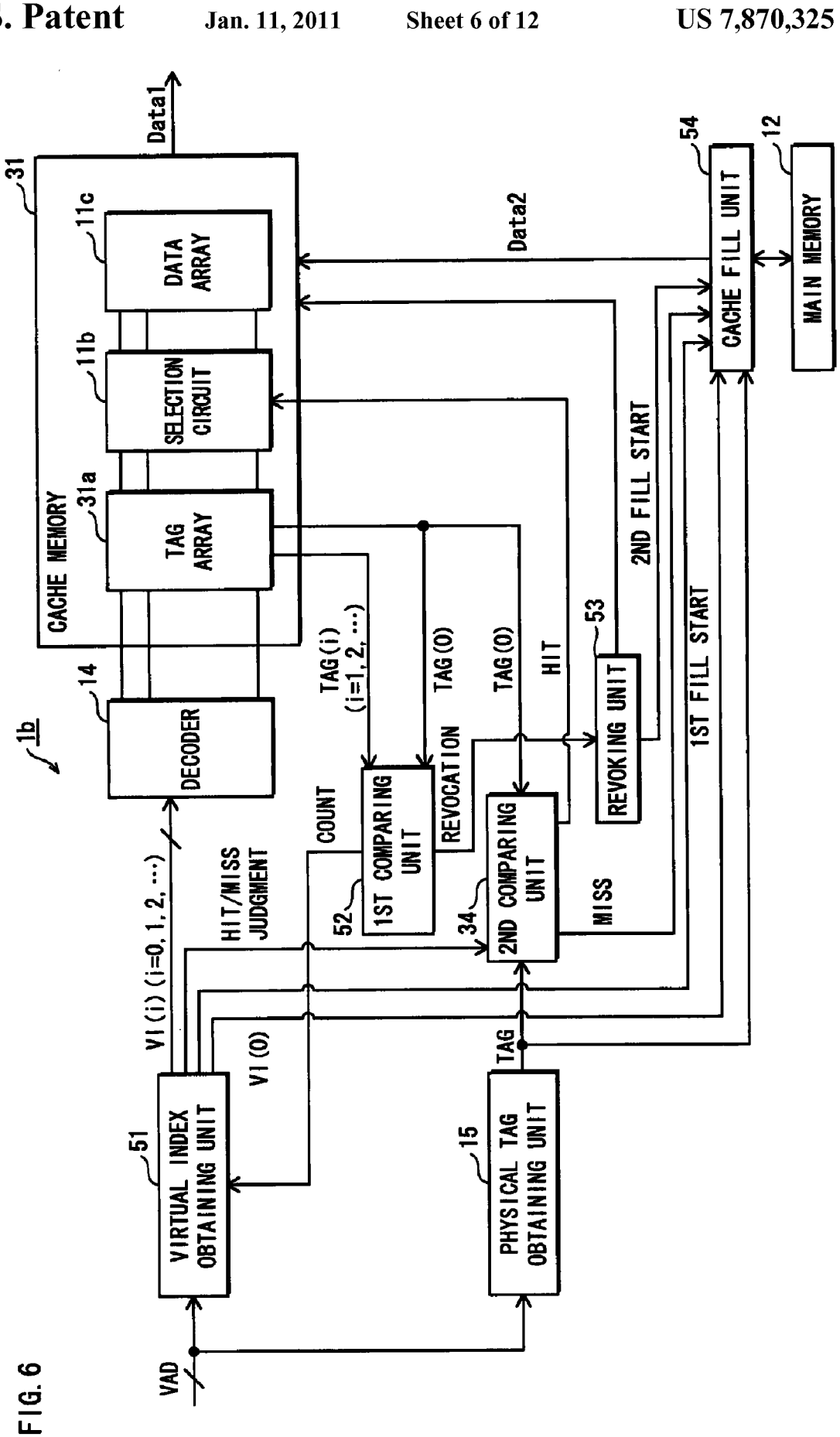
FIG. 6 shows a structure of a cache memory system of Embodiment 3.

The structure of a cache memory system of the present embodiment is described with reference to FIG. 6. FIG. 6 shows the structure of the cache memory system. Note that, in Embodiment 3, the components having the same functions as those in Embodiments 1 and 2 are given the same reference numerals or symbols, and their descriptions are omitted since the corresponding descriptions in Embodiments 1 and 2 can be applied here.

A cache memory system 1$b$ includes: the cache memory 31; the main memory 12; a virtual index obtaining unit 51; the decoder 14; the physical tag obtaining unit 15; a 1$^{st}$ comparing unit 52; the 2$^{nd}$ comparing unit 34; a revoking unit 53; and a cache fill unit 54.

The virtual index obtaining unit 51 obtains, based on a virtual address VAD input from a microprocessor (not shown), a virtual index VI(0) of an access-target cache line and virtual indexes VI(1), VI(2), . . . of cache potentially having a cache aliasing relationship with the access-target cache line. Then, the virtual index obtaining unit 51 outputs the obtained virtual indexes VI(i) (i=0, 1, 2, . . . ) to the decoder 14, and also outputs the virtual index VI(0) to the cache fill unit 54. To be more specific, the virtual index obtaining unit 51 first outputs the virtual index VI(0) and the virtual index VI(1) sequentially to the decoder 14 when the virtual address VAD is input from the microprocessor, and subsequently on each occasion when a count signal is input from the 1$^{st}$ comparing unit 52, the virtual index obtaining unit 51 outputs, from among the virtual indexes VI(2), VI(3), . . . , one having yet to be output to the decoder 14.

Then, if the virtual index obtaining unit 51 has already output, to the decoder 14, the virtual indexes VI(1), VI(2), . . . of all the cache lines potentially having a cache-aliasing relationship with the access-target cache line when a count signal is input from the 1$^{st}$ comparing unit 52, the virtual index obtaining unit 51 outputs a hit/miss judgment signal to the 2$^{nd}$ comparing unit 34, or outputs a 2$^{nd}$ fill start signal to the cache fill unit 54. To be more specific, the virtual index obtaining unit 51 outputs a hit/miss judgment signal when none of the count signals input from the 1$^{st}$ comparing unit 52 includes information indicating that revocation has been carried out, and outputs a 2$^{nd}$ fill start signal when any one of the count signals includes such information.

The 1$^{st}$ comparing unit 52 compares the tag information TAG(0) of the access-target cache line to the tag information TAG(i) (i=1, 2, . . . ) of the cache lines potentially having a cache-aliasing relationship with the access-target cache line. Then, if the tag information TAG(0) and tag information TAG(i) agree with each other, the 1$^{st}$ comparing unit 52 outputs, a revocation signal to the revoking unit 53. In this case, the 1$^{st}$ comparing unit 52 also outputs, to the virtual index obtaining unit 51, a count signal that includes information indicating revocation. If the tag information TAG(0) and tag information TAG(i) do not agree with each other, the 1$^{st}$ comparing unit 52 outputs a count signal that does not include information indicating revocation to the virtual index obtaining unit 51.

The revoking unit 53 revokes, when a revocation signal is input from the 1$^{st}$ comparing unit 52, the access-target cash line as well as cache lines having a cache-aliasing relationship with the access-target cache line, and outputs a 1$^{st}$ fill start signal to the cache fill unit 54. The revocation is realized by changing the tag information of the cache line to a predetermined value (which does not match any of the physical tags of the physical pages in the main memory) indicating that a corresponding cache line has been revoked.

The cache fill unit 54 performs, either when a miss signal is input or when both 1$^{st}$ and 2$^{nd}$ fill start signals are input, the same process as performed by the cache fill unit 17 to thereby store data in a cache line corresponding to the virtual index VI(0) (fill).

<Operations>

Figure 7:
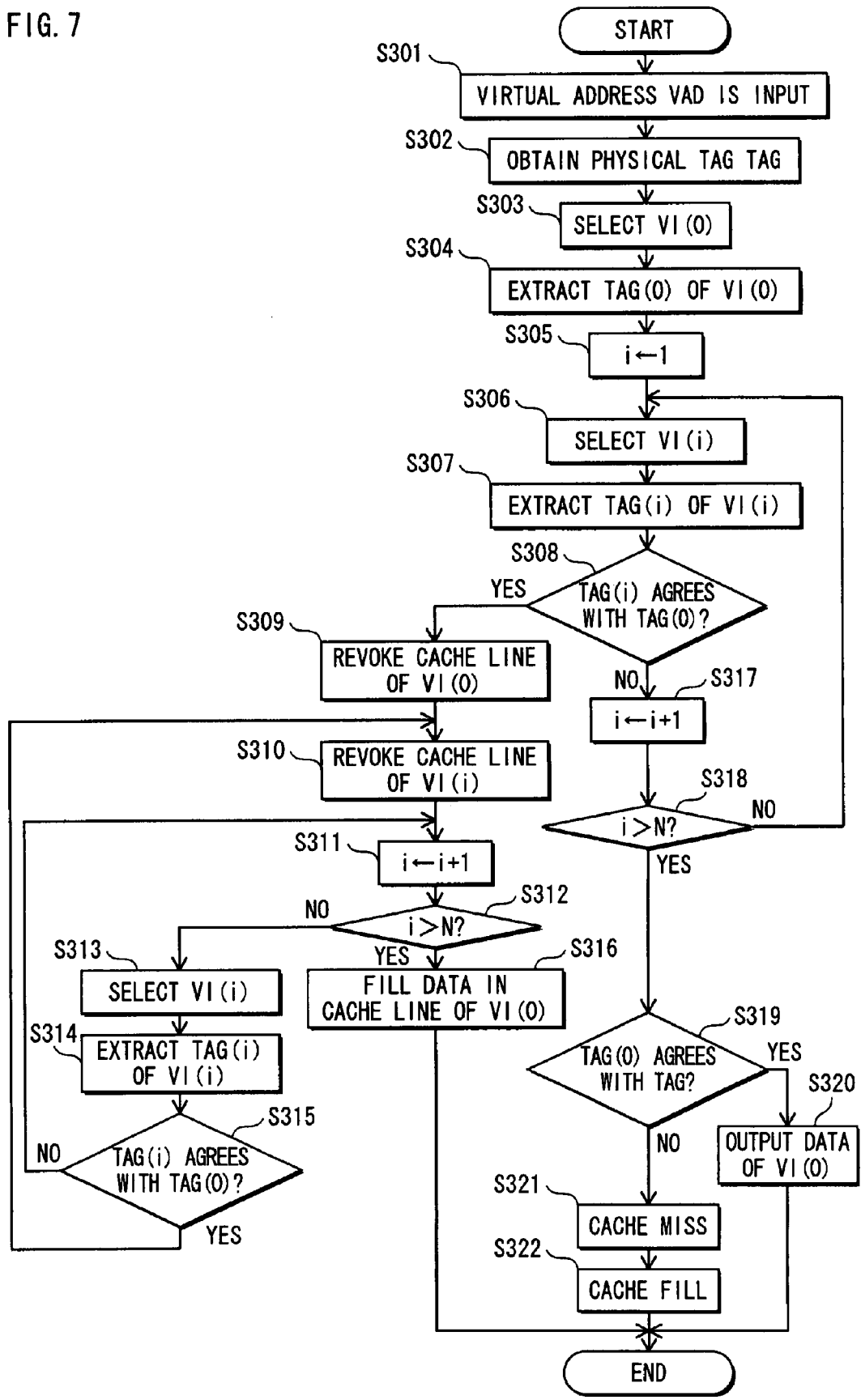
FIG. 7 is a flowchart showing operations of the cache memory system of FIG. 6.

The operations of the cache memory system of FIG. 6 are described with reference to FIG. 7. FIG. 7 is a flowchart of the operations of the cache memory system of FIG. 6.

The virtual address VAD is input from the microprocessor to the virtual index obtaining unit 51 and the physical tag obtaining unit 15 (Step S301). The physical tag obtaining unit 15 obtains the physical tag TAG based on the virtual address VAD (Step S302). The virtual index obtaining unit 51 selects the virtual index VI(0) of the access-target cache line as the virtual index to be output to the decoder 14, and outputs the selected virtual index VI(0) to the decoder 14 (Step S303).

The virtual index VI(0) is decoded by the decoder 14, and an access is made to a cache line corresponding to the virtual index VI(0). Herewith, the tag information TAG (0) corresponding to the virtual index VI(0) is extracted from the tag array 31a, and the tag information TAG(0) is output to the $1^{st}$ and $2^{nd}$ comparing units 52 and 34 (Step S304).

The virtual index obtaining unit 51 sets 1 to the counter value i (Step S305).

The virtual index obtaining unit 51 selects, as a virtual index to be output to the decoder 14, the virtual index VI(i) of a cache line potentially having a cache-aliasing relationship with the access-target cache line, and outputs the selected virtual index VI(i) to the decoder 14 (Step S306).

The virtual index VI(i) is decoded by the decoder 14, and an access is made to a cache line corresponding to the virtual index VI(i). Herewith, the tag information TAG(i) corresponding to the virtual index VI(i) is extracted from the tag array 31a, and the tag information TAG(i) is output to the $1^{st}$ comparing unit 52 (Step S307).

The $1^{st}$ comparing unit 52 compares the tag information TAG(0) and the tag information TAG(i) (Step S308).

In the comparison of Step S308, if the tag information TAG(i) agrees with the tag information TAG(0) (S308: YES), the $1^{st}$ comparing unit 52 outputs, to the revoking unit 53, a revocation signal indicating a detection of cache aliasing, and also outputs a count signal to the virtual index obtaining unit 51. The revoking unit 53 revokes a cache line corresponding to the virtual index VI(0), and outputs a $1^{st}$ fill start signal to the cache fill unit 54 (Step S309). The revoking unit 53 revokes a cache line corresponding to the virtual indexes VI(i) (Step S310).

The virtual index obtaining unit 51 increases, when a count signal is input, the counter value i by 1 (Step S311). The virtual index obtaining unit 51 judges whether the counter value i, after the increment, is larger than a constant N (Step S312). Note that the constant N is determined in the same manner as in Embodiment 1.

In the judgment of Step S312, if the counter value i is not larger than the constant N (S312: NO), the virtual index obtaining unit 51 selects the virtual index VI(i) and outputs the selected virtual index VI(i) to the decoder 14 (Step S313), in order to perform a judgment process on a cache line potentially having the cache-aliasing relationship and having yet to be a target of the cache-alias judgment.

The virtual index VI(i) is decoded by the decoder 14, and an access is made to a cache line corresponding to the virtual index VI(i). Herewith, the tag information TAG(i) corresponding to the virtual index VI(i) is extracted from the tag array 31a, and the tag information TAG(i) is output to the $1^{st}$ comparing unit 52 (Step S314).

The $1^{st}$ comparing unit 52 compares the tag information TAG(0) and the tag information TAG(i) (Step S315). In the comparison, if the tag information TAG(i) agrees with the tag information TAG(0) (S315: YES), the process of Step S310 onwards is carried out; if they do not agree with each other (S315: NO), the process of Step S311 onwards is carried out.

In the judgment of Step S312, if the counter value i is larger than the constant N (S312: YES), the virtual index obtaining unit 51 outputs a $2^{nd}$ fill start signal to the cache fill unit 54. The cache fill unit 54 fills, when both $1^{st}$ and $2^{nd}$ fill start signals are input, data of the main memory 12 in a cache line of the cache memory 11, corresponding to the virtual index VI(0) (Step S316).

In the comparison of Step S308, if the tag information TAG(i) does not agree with the tag information TAG(0) (S308: NO), the $1^{st}$ comparing unit 52 outputs a count signal to the virtual address obtaining unit 51, and subsequently the virtual address obtaining unit increases the counter value i by 1 (Step S317).

The virtual index obtaining unit 51 judges whether the counter value i is larger than the constant N (Step S318).

In the judgment of Step S318, if the counter value i is not larger than the constant N (S318: NO), the process of Step S306 onwards is executed in order to perform a judgment process on a cache line potentially having the cache-aliasing relationship and having yet to be a target of the cache-alias judgment.

The counter value i being judged larger than the constant N in the judgment of Step S318 (S318: YES) means that no cache aliasing was detected in any of the cache lines potentially having a cache-aliasing relationship with the access-target cache line. Accordingly, the virtual index obtaining unit 51 outputs a hit/miss judgment signal to the $2^{nd}$ comparing unit 34. The $2^{nd}$ comparing unit 34 compares, when a hit/miss judgment signal is input, the physical tag TAG to the tag information TAG(0) (Step S319).

In the comparison, if the tag information TAG(0) agrees with the physical tag TAG (S319: YES), the $2^{nd}$ comparing unit 34 outputs a hit signal indicating a cache hit to the selection circuit 11b. Herewith, the selection circuit 11b outputs data of a cache line corresponding to the virtual index VI(0) to the microprocessor (Step S320).

In the comparison, if the tag information TAG(0) does not agree with the physical tag TAG (S319: NO), the $2^{nd}$ comparison unit 34 outputs a miss signal indicating a cache miss to the cache fill unit 54 (Step S321). Then, the cache fill unit 54 fills, when a miss signal is input, data of the main memory 12 in a cache line of the cache memory 31, corresponding to the virtual index VI(0) (Step S322).

Embodiment 4

Embodiment 4 of the present invention is explained next with reference to drawings. Embodiment 4 is structured by adding, to the cache memory system of Embodiment 2, a function of revoking a cache line having a cache-aliasing relationship when cache aliasing is detected. Note that the cache memory of the present embodiment is a write-through cache memory.

<Structure>

Figure 8:
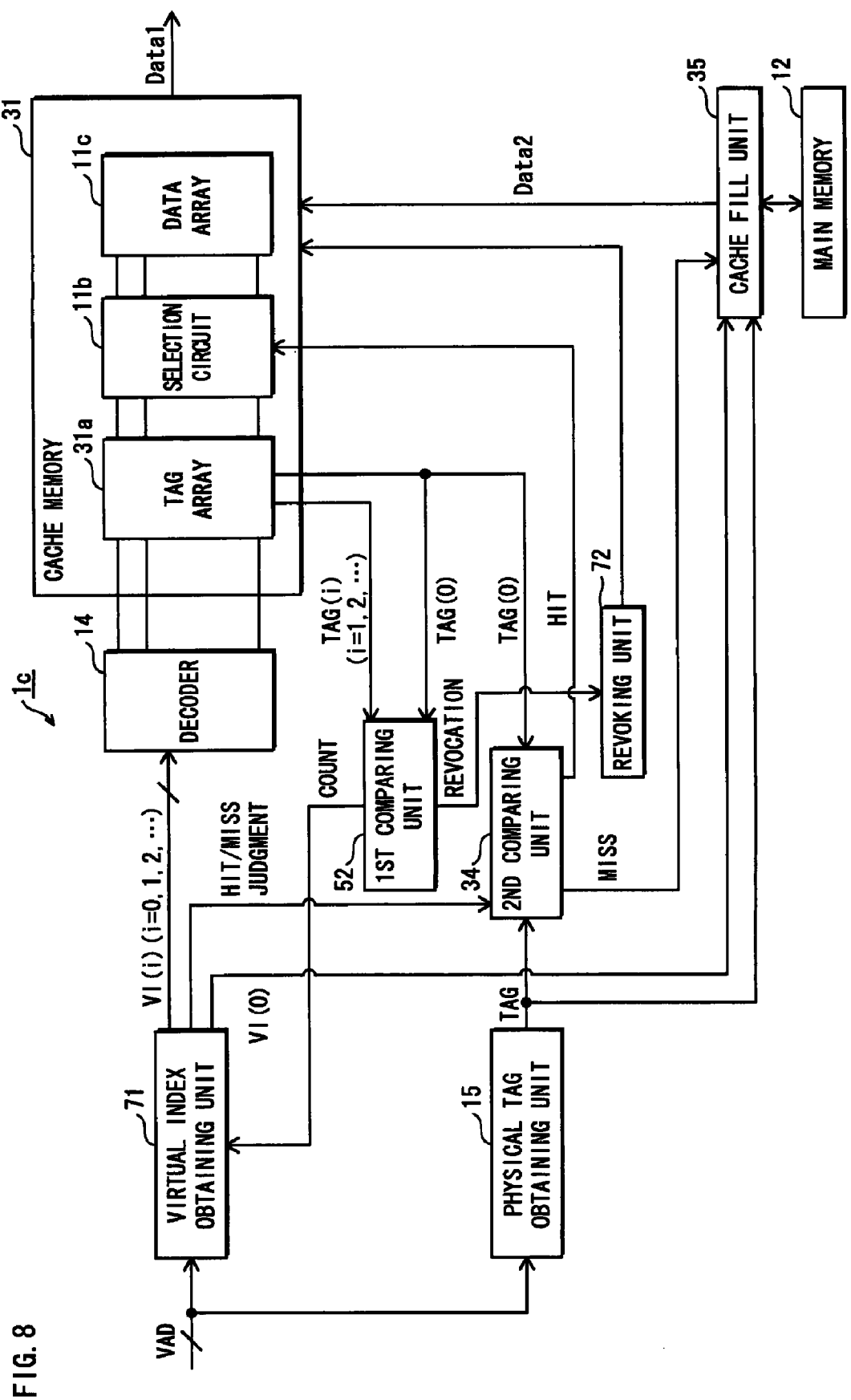
FIG. 8 shows a structure of a cache memory system of Embodiment 4.

The structure of a cache memory system of the present embodiment is described with reference to FIG. 8. FIG. 8 shows the structure of the cache memory system. Note that, in Embodiment 4, the components having the same functions as those in Embodiments 1 to 3 are given the same reference numerals or symbols, and their descriptions are omitted since the corresponding descriptions in Embodiments 1 to 3 can be applied here.

A cache memory system 1c includes: the cache memory 31; the main memory 12; a virtual index obtaining unit 71; the decoder 14; the physical tag obtaining unit 15; the $1^{st}$ comparing unit 52; the $2^{nd}$ comparing unit 34; a revoking unit 72; and the cache fill unit 35.

The virtual index obtaining unit 71 obtains, based on a virtual address VAD input from a microprocessor (not shown), a virtual index VI(0) of an access-target cache line and virtual indexes VI(1), VI(2), . . . of cache lines that potentially have a cache aliasing issue with the access-target cache line. Then, the virtual index obtaining unit 71 outputs the obtained virtual indexes VI(i) (i=0, 1, 2, . . . ) to the decoder 14, and also outputs the virtual index VI(0) to the cache fill unit 35. To be more specific, the virtual index obtaining unit 71 first outputs the virtual index VI(0) and the virtual index VI(1) sequentially to the decoder 14 when the virtual address VAD is input from the microprocessor, and subsequently on each occasion when a count signal is input from the $1^{st}$ comparing unit 52, the virtual index obtaining unit 71 outputs, from among the virtual indexes VI (2), VI(3), . . ., one having yet to be output to the decoder 14. Note that, unlike the count signals of Embodiment 3, the count signals of the present embodiment do not include information regarding revocation.

Then, if the virtual index obtaining unit 71 has already output, to the decoder 14, the virtual indexes VI(1), VI(2), . . . of all the cache lines potentially having a cache-aliasing relationship with the access-target cache line when a count signal is input from the $1^{st}$ comparing unit 52, the virtual index obtaining unit 71 outputs a hit/miss judgment signal to the $2^{nd}$ comparing unit 34.

The revoking unit 72 revokes, when a revocation signal is input from the $1^{st}$ comparing unit 52, cache lines having a cache-aliasing relationship with the access-target cache line.

<Operations>

Figure 9:
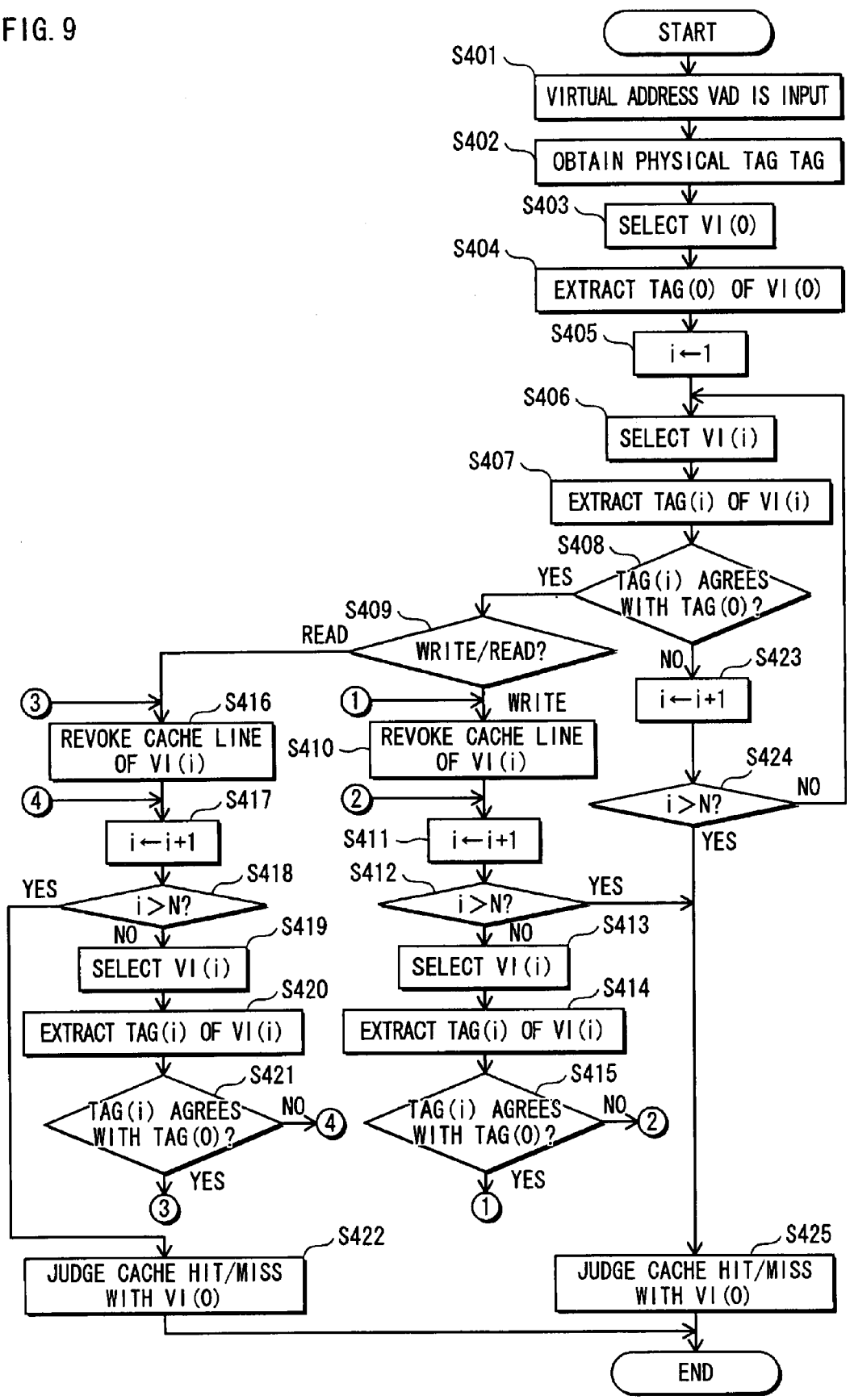
FIG. 9 is a flowchart showing operations of the cache memory system of FIG. 8.

The operations of the cache memory system of FIG. 9 are described with reference to FIG. 8. FIG. 9 is a flowchart of the operations of the cache memory system of FIG. 8.

The virtual address VAD is input from the microprocessor to the virtual index obtaining unit 71 and the physical tag obtaining unit 15 (Step S401). The physical tag obtaining unit 15 obtains the physical tag TAG based on the virtual address VAD (Step S402). The virtual index obtaining unit 71 selects the virtual index VI(0) of the access-target cache line as the virtual index to be output to the decoder 14, and outputs the selected virtual index VI(0) to the decoder 14 (Step S403).

The virtual index VI(0) is decoded by the decoder 14, and an access is made to a cache line corresponding to the virtual index VI(0). Herewith, the tag information TAG(0) corresponding to the virtual index VI(0) is extracted from the tag array 31a, and the tag information TAG(0) is output to the $1^{st}$ and $2^{nd}$ comparing units 52 and 34 (Step S404).

The virtual index obtaining unit 71 sets 1 to the counter value i (Step S405).

The virtual index obtaining unit 71 selects, as a virtual index to be output to the decoder 14, the virtual index VI(i) of a cache line potentially having a cache-aliasing relationship with the access-target cache line, and outputs the selected virtual index VI(i) to the decoder 14 (Step S406).

The virtual index VI(i) is decoded by the decoder 14, and an access is made to a cache line corresponding to the virtual index VI (i). Herewith, the tag information TAG(i) corresponding to the virtual index VI(i) is extracted from the tag array 31a, and the tag information TAG(i) is output to the $1^{st}$ comparing unit 52 (Step S407).

The $1^{st}$ comparing unit 52 compares the tag information TAG(0) and the tag information TAG(i) (Step S408).

In the comparison of Step S408, if the tag information TAG(i) agrees with the tag information TAG(0) (S408: YES), the $1^{st}$ comparing unit 52 outputs, to the revoking unit 72, a revocation signal indicating a detection of cache aliasing, and also outputs a count signal to the virtual index obtaining unit 71. The revoking unit 72 judges whether to perform a write request or a read request (Step S409).

In the judgment of Step S409, if it is a write request (S409: WRITE), the revoking unit 72 revokes a cache line corresponding to the virtual index VI(i) (Step S410).

The virtual index obtaining unit 71 increases, when a count signal is input, the counter value i by 1 (Step S411). The virtual index obtaining unit 71 judges whether the counter value i, after the increment, is larger than a constant N (Step S412). Note that the constant N is determined in the same manner as in Embodiment 1.

In the judgment of Step S412, if the counter value i is not larger than the constant N (S412: NO), the virtual index obtaining unit 71 selects the virtual index VI(i) and outputs the selected virtual index VI(i) to the decoder 14 (Step S413), in order to perform a judgment process on a cache line potentially having the cache-aliasing relationship and having yet to be a target of the cache-alias judgment.

The virtual index VI(i) is decoded by the decoder 14, and an access is made to a cache line corresponding to the virtual index VI(i). Herewith, the tag information TAG(i) corresponding to the virtual index VI(i) is extracted from the tag array 31a, and the tag information TAG(i) is output to the $1^{st}$ comparing unit 52 (Step S414).

The $1^{st}$ comparing unit 52 compares the tag information TAG(0) and the tag information TAG(i) (Step S415). In the comparison, if the tag information TAG(i) agrees with the tag information TAG(0) (S415: YES), the process of Step S410 onwards is carried out; if they do not agree with each other (S415: NO), the process of Step S411 onwards is carried out.

In the judgment of Step S412, if the counter value i is larger than the constant N (S412: YES), the virtual index obtaining unit 71 outputs a hit/miss judgment signal to the $2^{nd}$ comparing unit 34, and then the $2^{nd}$ comparing unit 34 determines a cache hit or miss by comparing the physical tag TAG and the tag information TAG(0) of the access-target cache line (Step. S425). According to the determination, the cache fill process and the like is performed.

In the judgment of Step S409, if it is a read request (S409: READ), the revoking unit 72 revokes a cache line corresponding to the virtual index VI(i) (Step S416).

The virtual index obtaining unit 71 increases, when a count signal is input, the counter value i by 1 (Step S417). The virtual index obtaining unit 71 judges whether the counter value i, after the increment, is larger than the constant N (Step S418).

In the judgment of Step S418, if the counter value i is not larger than the constant N (S418: NO), the virtual index obtaining unit 71 selects the virtual index VI(i) and outputs the selected virtual index VI(i) to the decoder 14 (Step S419), in order to perform a judgment process on a cache line potentially having the cache-aliasing relationship and having yet to be a target of the cache-alias judgment.

The virtual index VI(i) is decoded by the decoder 14, and an access is made to a cache line corresponding to the virtual index VI(i). Herewith, the tag information TAG(i) corresponding to the virtual index VI(i) is extracted from the tag array 31a, and the tag information TAG(i) is output to the $1^{st}$ comparing unit 52 (Step S420).

The $1^{st}$ comparing unit 52 compares the tag information TAG(0) and the tag information TAG(i) (Step S421). In the comparison, if the tag information TAG(i) agrees with the tag information TAG(0) (S421: YES), the process of Step S416 onwards is carried out; if they do not agree with each other (S421: NO), the process of Step S417 onwards is carried out.

In the judgment of Step S418, if the counter value i is larger than the constant N (S418: YES), the virtual index obtaining unit 71 outputs a hit/miss judgment signal to the $2^{nd}$ comparing unit 34, and then the $2^{nd}$ comparing unit 34 determines a cache hit or miss by comparing the physical tag TAG and the tag information TAG(0) of the access-target cache line (Step S422). According to the determination, the cache fill process and the like is performed.

In the comparison of Step S408, if the tag information TAG(i) does not agree with the tag information TAG(0) (S408: NO), the $1^{st}$ comparing unit 52 outputs a count signal to the virtual address obtaining unit 71, and then the virtual address obtaining unit 71 increases the counter value i by 1 (Step S423).

The virtual index obtaining unit 71 judges whether the counter value i is larger than the constant N (Step S424).

In the judgment of Step S424, if the counter value i is not larger than the constant N (S424: NO), the process of Step S406 onwards is executed in order to perform a judgment process on a cache line potentially having the cache-aliasing relationship and having yet to be a target of the cache-alias judgment.

The counter value i being judged larger than the constant N in the judgment of Step S424 (S424: YES) means that no cache aliasing was detected in any of the cache lines potentially having a cache-aliasing relationship with the access-target cache line. Accordingly, the virtual index obtaining unit 71 outputs a hit/miss judgment signal to the $2^{nd}$ comparing unit 34. The $2^{nd}$ comparing unit 34 determines, when a hit/miss judgment signal is input, a cache hit or miss by comparing the physical tag TAG and the tag information TAG(0) of the access-target cache line (Step S425). According to the determination, the cache fill process and the like is performed.

[Additional Particulars]

The present invention is not limited to the above embodiments, and the following cases are, for example, also within the scope of the present invention.

(1) The above embodiments are described with an example of a direct map cache memory; however, the present invention is not limited to this type of cache memory, and can be applied to various types of cache memories in which cache aliasing can occur.

(2) In Embodiment 1, when none of the tag information TAG(i) of the access-target cache line and cache lines potentially having a cache-aliasing relationship with the access-target cache line agrees with the physical tag TAG, it is determined as a cache miss, and then data of the main memory 12 is filled in the access-target cache line. The present invention is, however, not limited to this case, and for example, the data from the main memory 12 may be filled in any one of the access-target cache line and the cache lines potentially having the cache-aliasing relationship.

(3) In Embodiment 1, when none of the tag information TAG(i) of the access-target cache line and cache lines potentially having a cache-aliasing relationship with the access-target cache line agrees with the physical tag TAG, it is determined as a cache miss, and then data of the main memory 12 is filled in the access-target cache line. The present invention is, however, not limited to this case. For example, the data of the main memory 12 may be filled in, from among the access-target cache line and the cache lines potentially having the cache-aliasing relationship, one having yet to store therein data.

(4) In Embodiment 3, when cache aliasing is detected, data of the main memory 12 is filled in the access-target cache line. The present invention is, however, not limited to this case, and for example, the data of the main memory 12 may be filled in one of the cache lines which have been revoked due to having a cache-aliasing relationship with the access-target cache line.

(5) In Embodiment 4, when cache aliasing is detected and a read request is to be performed, a cache line having a cache-aliasing relationship with the access-target cache line is revoked. The present invention is, however, not limited to this case. For example, all but one of the access-target cache line and the cache lines having the cache-aliasing relationship are revoked, and the cache hit/miss judgment is made using the unrevoked cache line.

(6) The entire processes of the cache aliasing prevention method and the cache aliasing detection method of each embodiment above may be realized by hardware or software, or part of the processes may be realized by hardware and the remaining part may be realized by software.

Although the present invention has been fully described by way of examples with reference to the accompanying drawings, it is to be noted that various changes and modifications depart from the scope of the present invention, they should be constructed as being included therein.

What is claimed is:

1. A cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks, the cache memory system comprising:

a virtual index obtaining unit operable to obtain, based on a virtual address, virtual indexes of an access-target cache line and one or more cache lines potentially having a cache-aliasing relationship with the access-target cache line;

a physical tag obtaining unit operable to obtain a physical tag of a physical page by converting at least part of the virtual address; and a comparing unit operable to compare the physical tag with each of tag information pieces output from the tag array based on the virtual indexes, and determine a cache hit when one of the tag information pieces agrees with the physical tag.

2. The cache memory system of claim 1, further comprising:

a cache fill unit operable to, (i) when none of the tag information pieces agrees with the physical tag and (ii) if at least one of the access-target cache line and the cache line potentially having a cache-aliasing relationship includes no data therein, perform a cache fill on one of the at least one cache line including no data therein.

3. A cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks, the cache memory system comprising:

a virtual index obtaining unit operable to obtain, based on a virtual address, virtual indexes of an access-target cache line and one or more cache lines potentially having a cache-aliasing relationship with the access-target cache line; and a comparing unit operable to detect cache aliasing by comparing a tag information piece output from the tag array based on the virtual index of the access-target cache line with tag information pieces output from the tag array based on the virtual indexes of the cache lines potentially having a cache-aliasing relationship.

4. The cache memory system of claim 3, wherein
the cache memory is a write-through cache, and
the cache memory system further comprising:
a revoking unit operable to, if the comparing unit detects the cache aliasing, revoke the access-target cache line and the cache lines having a cache-aliasing relationship; and
a cache fill unit operable to perform a cache fill on one of the cache lines having revoked by the revoking unit to fill data of the main memory therein.

5. The cache memory system of claim 3, wherein
the cache memory is a write-through cache, and
the cache memory system further comprising:
a revoking unit operable to, if the comparing unit detects the cache aliasing and a write request is to be performed, revoke the cache lines having a cache-aliasing relationship;
a physical tag obtaining unit operable to obtain a physical tag of a physical page by converting at least part of the virtual address; and
a physical tag comparing unit operable to compare whether the tag information piece of the access-target cache line agrees with the physical tag, and determine a cache hit when a comparison result is affirmative and determine a cache miss when the comparison result is negative.

6. The cache memory system of claim 3, wherein
the cache memory is a write-through cache, and
the cache memory system further comprising:
a revoking unit operable to, if the comparing unit detects the cache aliasing and a read request is to be performed, revoke the access-target cache line and the cache lines having a cache-aliasing relationship, except for one cache line;
a physical tag obtaining unit operable to obtain a physical tag of a physical page by converting at least part of the virtual address; and
a physical tag comparing unit operable to compare whether a tag information piece of the one cache line not revoked by the revoking unit agrees with the physical tag, and determine a cache hit when a comparison result is affirmative and determine a cache miss when the comparison result is negative.

7. A cache control method used in a cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks, the cache control method comprising the steps of:
obtaining, based on a virtual address, virtual indexes of an access-target cache line and a cache line potentially having a cache-aliasing relationship with the access-target cache line;
obtaining a physical tag of a physical page by converting at least part of the virtual address; and
comparing whether the physical tag agrees with one of tag information pieces output from the tag array based on the virtual indexes, and determining a cache hit when a comparison result is affirmative and determining a cache miss when the comparison result is negative.

8. A cache aliasing detection method used in a cache memory system for making, using VIPT (Virtual Indexed Physical Tagged) architecture, access to a cache memory having (i) a plurality of cache lines each identified by a different virtual index, (ii) a tag array storing therein tag information pieces corresponding one-to-one with physical tags, each of which indicates a physical page including physical blocks of a main memory whose data is stored in the cache lines, and (iii) a data array storing therein data of the physical blocks, the cache aliasing detection method comprising the steps of:
obtaining, based on a virtual address, virtual indexes of an access-target cache line and a cache line potentially having a cache-aliasing relationship with the access-target cache line; and
comparing a tag information piece output from the tag array based on the virtual index of the access-target cache line with a tag information piece output from the tag array based on the virtual index of the cache line potentially having a cache-aliasing relationship.

* * * * *